United States Patent [19]
Malouf et al.

[11] Patent Number: 6,082,037
[45] Date of Patent: Jul. 4, 2000

[54] FISHING LURE AND NOVELTY ITEM HAVING A STRUCTURE AND APPEARANCE PROVIDED BY COINS

[76] Inventors: Mark B. Malouf, 1334 Woodland Ave., #1, Salt Lake City, Utah 84106; Richard L. Stevenson, 6885 S. Redwood Rd., #1008, West Jordan, Utah 84084

[21] Appl. No.: 09/296,955

[22] Filed: Apr. 22, 1999

[51] Int. Cl.[7] .............................. A01K 85/10; A01K 85/14
[52] U.S. Cl. .......................... 43/42.14; 43/42.15; 43/42.5; 43/42.32; D22/129
[58] Field of Search ......................... 43/42, 42.32, 42.39, 43/42.5, 42.15, 42.14, 42.16, 42.17, 42.18, 42.34; D22/144, 136, 129–133, 132, 126, 130

[56] References Cited

U.S. PATENT DOCUMENTS

| | | |
|---|---|---|
| 744,942 | 11/1903 | Stewart . |
| 1,620,972 | 3/1927 | Hobbs . |
| 2,000,734 | 5/1935 | Accetta . |
| 2,032,819 | 3/1936 | Tengel . |
| 2,037,310 | 4/1936 | Bryan . |
| 2,043,001 | 6/1936 | Lambrecht . |
| 2,805,512 | 9/1957 | Bunce . |
| 2,895,253 | 7/1959 | Hess . |
| 4,507,892 | 4/1985 | Ochs ...................................... 43/42.18 |
| 4,936,041 | 6/1990 | Couture ................................. 43/42.15 |

OTHER PUBLICATIONS

The Original Mister Twister 1999 Tackle Catalog.
Mepps World's #1 Lure 1999 Fishing Guide.

*Primary Examiner*—Jack W. Lavinder
*Attorney, Agent, or Firm*—Daniel McCarthy

[57] ABSTRACT

A novelty item in the form of a fishing lure made from a plurality of coins and a fishing lure of the same configuration. The coins form the body of the lure, with one or more attached fishhooks and a means for attaching a fishing line. Other embodiments of the invention add headpieces and tailpieces shaped like the heads or tails of fish, optionally with hooks attached to these pieces. The elements of the invention may be connected so as to provide independent motion with respect to each other, in other embodiments may be connected rigidly, or in other embodiments are connected to allow motion in one plane only. Streamers and feathers may be incorporated so as to conceal the hooks and to provide an attractive appearance.

11 Claims, 2 Drawing Sheets

FISHING LURE AND NOVELTY ITEM HAVING A STRUCTURE AND APPEARANCE PROVIDED BY COINS

BACKGROUND OF THE INVENTION

A. Field of the Invention

The invention relates to the fields of fishing lures and of novelty items. In particular, the invention relates to novelty items made with a plurality of coins to create the appearance of a fishing lure, and to fishing lures themselves. The novel appearance and structure of the invention are provided by the use of coins.

B. The Background Art

The industry of recreational fishing, or angling, is a multi-billion dollar industry in the United States. The sale of fishing lures to anglers generates a substantial portion of this annual revenue. Fishing lures are designed to attract fish, but are also sometimes designed with the attraction to anglers as an object.

Fishing lures are made with a great variety of materials, colors and shapes. The prior art contains fishing lures with feathers, spinners, iridescent painted bodies, garishly painted bodies, shiny metal objects, noisemakers, vibrators, streamers and a multitude of other devices in a multitude of combinations. The tremendous variety of fishing lures attests to the difficulty of predicting what will attract a fish on any given day in any given place. The attractiveness of the object to the angler, and his estimation of its efficacy in catching fish, is sometimes of greater importance to the object's sale than any demonstrated capacity for enticing fish to bite on the lure. In some instances, the fishing lure's primary object seems more to be a droll or humorous comment on the sport of fishing and the habits of the angler than to be used in the sport itself.

The essential elements of any fishing lure are unchanged since the time of Izaak Walton, however. They are three: an object that will not vanish or dissipate upon immersion in water, a means for attaching that object to a fishing line, and a means for firmly engaging the mouth of the fish that bites upon that object.

Against this background, the inventors have conceived of a novel and unique object constructed with coins to have the appearance of a fishing lure.

SUMMARY OF THE INVENTION

Some preferred embodiments of the present invention contain the three essential elements of a fishing lure: (a) those embodiments employ the use of two or more coins attached to each other to form a body of the lure or to be part of a body of a lure; (b) one or more eyelets, receptacles or fasteners for attachment of the coins of the invention to each other and to a fishing line; and (c) one or more barbed hooks, either attached directly or indirectly to the coins or the body of the lure. In addition, the invention can contain optional elements such as feathering, metal objects of various fish-like shapes, spinners, hinges or swivels. In the most preferred embodiments of the invention, the coins are United States pennies.

It is an object of the invention to provide a fishing lure that will attract fish to bite on it by its motion in the water. In a preferred embodiment of the invention, the elements of the invention, particularly the coins, are independently movable with respect to each other as they movably attached to each other or are hinged to each other. As the invention is pulled through the water on the end of a fishing line, the effective current causes the coins to move with respect to each other or to wiggle in an irregular fashion. The coins also move with respect to the hook and with respect to the line, and vice versa. It is surmised that such motion resembles the appearance of a fish, a wounded fish or a sick fish to a piscine predator.

It is an object of the invention to provide a fishing lure that will attract fish to bite on it by its color and light-reflecting properties. The coins forming the invention being colored metal reflect ambient light and provide a sparkling or flashing appearance as they move through the water. Coins of different colors (such as pennies and dimes) will present a different appearance in the water and will resemble different species of fish. It is surmised that such an appearance also resembles the appearance of a smaller fish to a predator such as a larger fish.

It is an object of the invention to provide a fishing lure which is self-sinking and does not require the use of additional weights to propel the lure toward the bottom of the chosen body of water. In its preferred embodiments, the coins of the invention will provide sufficient weight to serve the function of the sinker as well as forming the body of the lure.

It is an object of the invention to provide a non-corrosive fishing lure. The use of coins made of certain metals other than copper, in contact with the steel of fishhooks and other objects creates in some embodiments a non-conductive combination of elements, which can be immersed in seawater and other water without corrosion.

It is an object of the invention to provide a novelty item attractive to anglers and those who buy gifts for anglers. The invention in some of its preferred embodiments can be produced at a low enough cost to price it as an impulse item, to be bought on the spur of the moment by a consumer actually seeking to purchase some other item. The use of coins to create the appearance of a fishing lure serves as a droll comment on the well-known adage that "a fish dinner is never more expensive than when you catch it yourself." It is an object of most preferred embodiments of the novelty item of the invention to catch a greater number of anglers than fish.

It is an object of the invention to provide a novelty item for someone seeking a gift for the angler "who has everything." The use of coins and fish-hooks, not seen in combination in the prior art, presents a unique opportunity for the gift-buyer to surprise the angler with a suitable gift that is unlikely to be duplicated in any other gift the angler receives.

It is an object of the invention to provide a gift for anglers that can be used as a showpiece rather than as a functioning fishing lure. In some embodiments, the use of high-value coins in the invention provides an opportunity to purchase a gift in a wide range of price categories, suitable for any gift-giving occasion or for any recipient. As an example, the use of gold coins, foreign coins and antique coins rather than pennies could be an appropriate gift for the avid and very wealthy angler who already possesses every other conceivable item of fishing gear. Although the invention would, in this example, still be a fully functional fishing lure, the inventors anticipate that its use will be for display rather than immersion in a body of water.

It is an object of the invention to provide a conversation piece for anglers, their friends and their relatives. It is well known that most fisherman spend more time discussing fishing and planning fishing trips than they actually spend fishing. The invention will facilitate such conversation and the consequent enjoyment of such discussions.

Additional objects, features and advantage of the invention will become apparent to persons of ordinary skill in the art upon reading the specification and upon reviewing the appended drawings.

DETAILED DESCRIPTION OF THE PREFERRED EMBODIMENTS

SUMMARY

The claimed invention is a fishing lure or novelty item, in different embodiments, made using one or more coins which may be arrayed in a linear fashion and attached to one or more fish-hooks. The coins may be attached to one another so as to be independently movable or may be adherent to an underlying substrate or otherwise rigidly affixed to each other. A fishing line is attached to the forward edge of the linear array, to a portion of the underlying substrate, to any of the coins, or to any portion of the lure where optimal balance will be achieved. Objects for attraction or concealment such as feathers, movable fins, fish body shapes, spinning blades, streamers, vibrators or snap connectors may be attached to the coins or to the substrate.

DETAILED DESCRIPTION OF THE INVENTION

Figure 1:
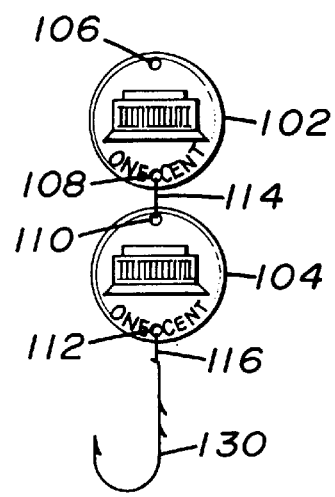
FIG. 1 shows the basic structure of one preferred embodiment of the invention.

FIG. 1 shows a frontal view of a basic embodiment of the invention. United States penny coins 102 and 104 are each provided with two through-holes or receptacles (106 and 108 on coin 102 and 110 and 112 on coin 104) on opposite edges of the circumference of said coins. Said coins are disposed in a linear fashion or a linear array, 102 being the forward coin and 104 being the rearward coin. Said through holes or receptacles are of sufficient caliber to allow passage of wire or line of appropriate strength to retain the coins in movable engagement with each other under most circumstances. A connector or connecting means 114 composed of wire, nylon fishing line or other suitable flexible wirelike or other strong material is disposed between coins 102 and 104. Said connecting means is secured by multiple twisted loops or by a knot at each of its ends to its own shaft or to the hole through which it passes. A second similar connecting means is disposed between hole 112 at the rearmost edge of coin 104 and is connected at its other end to fish-hook 130. Receptacle 106 may be used to attach the fishing lure to a fishing line or a swivel attached to a fishing line. Coins other than U.S. pennies may be used, such as dimes, nickels, quarters, half dollars, dollar coins, gold coins, foreign coins, subway tokens, casino tokens and other coins. As depicted, the coins will move with respect to each other when moving through water, and the hook is positioned at the rear end of the lure. This embodiment of the invention as a novelty item resembles a simple fishing lure.

Figure 2:
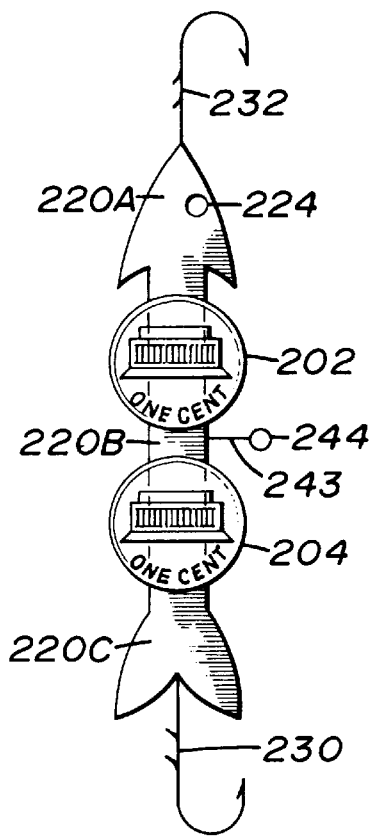
FIG. 2 shows an embodiment of the invention with the coins fixed to an underlying substrate or body rather than being independently movable.

FIG. 2 depicts an alternative embodiment of the invention. A rigid substrate generally in the form of a fish body with a stylized head and tail is shown with two coins attached to it. The lure includes tail portion 220C, mid portion 220B and head portion 220A which form the substrate on which coins 202 and 204 are mounted. The substrate can be formed of plastic, metal, wood, fabric, fiberglass or any rigid or bendable substance. Portions 220A, 220B and 220C form one continuous piece rather than being discrete pieces. Coins 202 and 204 are firmly adhered to said underlying substrate, being attached to said substrate by solder or non-water-soluble glue, welding, epoxy, brazing, riveting, or otherwise as applicable. Midportion 220B is provided with an extender 243 formed of wire, nylon fishing line or other suitable material, which is rigidly attached at one end to said midportion and at the other is formed into a loop or eyelet 244 suitable for the attachment of a fishing line or swivel. Hook 232 is attached at the foremost edge of head portion 220A and hook 230 is attached at the middle of the rear edge of tail portion 220C. Head portion 220A is drilled with a hole 224 to resemble an eye and is provided with backward facing gils on its upper and lower surface. Tail portion 220C is shaped like a fishtail with opposing half-ovals at forty-five degree angles to one another, separated deep notch with convex sides meeting in the middle of said rear edge at approximately ninety degrees. A notch is formed thereby in said rear edge of said tail portion, at which point rear hook 230 is attached. This embodiment of the invention presents the appearance of a jig-type lure. In alternative embodiments, the eye may be painted on or it may be attached by an adhesive. Further, the coins or other parts of the lure or novelty item maybe painted, plated, galvanized, anodized, powder coated, brazed, or otherwise covered, protected or decorated. As this lure moves through the water, the coins and the substrate do not move with respect to each other.

Figure 3:
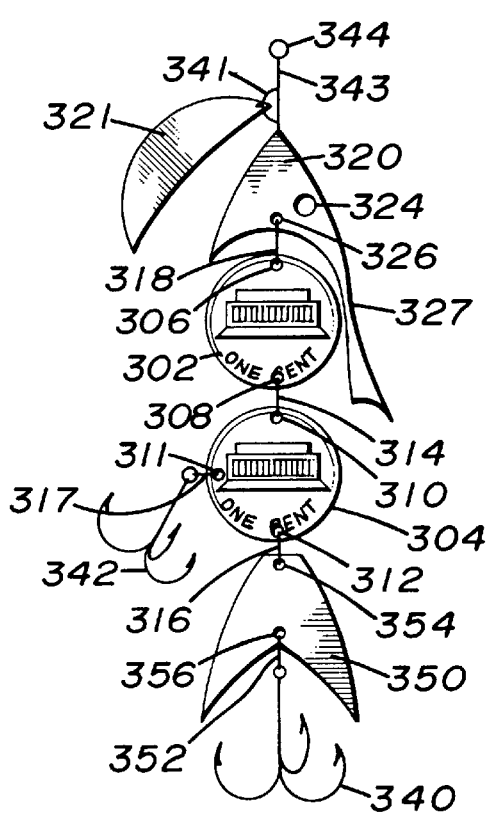
FIG. 3 shows an embodiment of the invention the invention with optional attachments for further attracting fish and engaging their mouths more firmly.

FIG. 3 depicts another embodiment of the invention in which multiple separate parts of a lure are attached for purposes of added fish attraction and firmer fish mouth engagement. A fish head shape 320 is disposed forward of coin 302 and attached thereto by connecting means 318 through holes 306 and 326. Fish head 320 is provided with extender 343 and eyelet 344 on the foremost point of said fish head, which point resembles the nose of the fish. Said extender and eyelet are made in a similar fashion to the extender and eyelet depicted in FIG. 2. Extender 343 is provided in its midportion with an additional loop or fastener 341 onto which movable fin or swivel 321, such as a crescent shaped piece of flat material, is attached. The movable fin 321 will preferably spin around the extender 343 and generally about the longitudinal axis of the lure when the lure is moved through the water in order to create a flashing similar to light reflecting off a swimming fish in order to provide a realistic fish appearance in the lure and to cause fish to bite the lure. Fish head 320 has at its upper trailing edge a backward extending fin 327, a continuous piece of material shaped as an elongated triangle, which piece of material passes one edge of coin 302. Coins 302 and 304 are disposed and connected in a linear array arrangement in the same fashion as described for coins in FIG. 1. Coin 304 has additional hole 311, midway along its circumference between holes 310 and 312 on said coin. Said additional hole acts as an eyelet from which treble hook 342 is attached with connecting means 317. The rearmost hole 312 of coin 304 is connected by connecting means 316 to fishtail 350 through hole 354. From hole 356 in the middle of the rear edge of fishtail 350, another treble hook 340 is suspended and attached by a connecting element 352. As this lure moves through the water, each of the head, the coins, the tail and the movable fin are separately movable with respect to each other.

Figure 4:
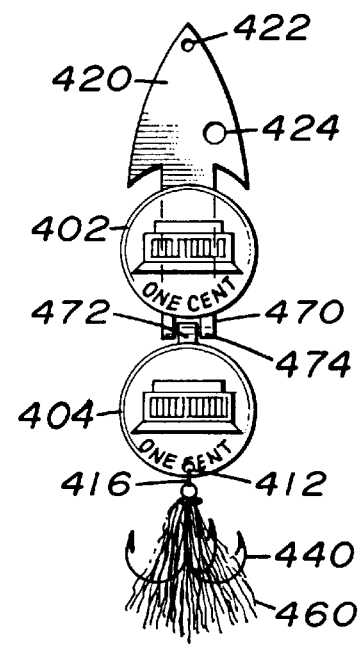
FIG. 4 shows an embodiment of the invention with the addition of feathers to conceal the hook and to present a more attractive appearance to a fish.

FIG. 4 depicts another preferred embodiment of the invention in which coins 402 and 404 are attached to each other by a hinge. Fish head 420 is a piece of flat material. Said fish head forms a substrate on which coin 402 is affixed. The rear portion of fish head 420 extends beneath coin 402 as suggested by the dashed lines and then divides into two hinge brackets 470 into each of which a hole is drilled in alignment with the plane of coin 402. Said hinge brackets are separated by a receiving notch, into which receiving notch hinge bracket 472 fits, being disposed between brackets 470. A hole is likewise placed in hinge bracket 472 aligned with said holes in brackets 470. Through said holes in brackets 470 and 472, hinge pin 474 is placed and is flattened at each thereafter in order to prevent its displacement from within said brackets. Hinge bracket 470 is attached to the edge of coin 404. Hole 412 lies on the opposite circumferential edge of coin 404. Treble hook 440 is suspended from coin 404 by connecting means 416 through hole 412. Attached to and depending from the eyelet of treble hook 440 is a plurality 460 of feathers, plastic streamers, fabric strips or other streaming material suitable for concealing hook 440 and to make the lure more attractive. The hinge permits movement of the front coin and head with respect to the rear coin as the lure moves through the water.

Figure 5:
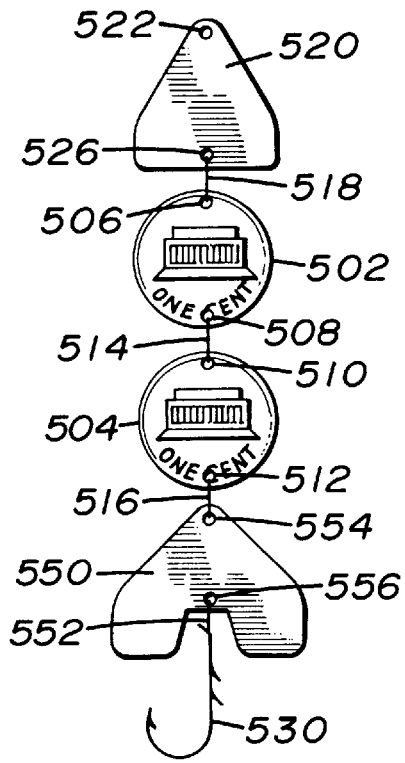
FIG. 5 shows an embodiment of the invention and the relationship of attachments formed to resemble parts of a fish.

FIG. 5 depicts another preferred embodiment of the invention in which coins 502 and 504 are disposed in movable relation to each other. A headpiece 520 and a tailpiece 550 are included. Headpiece 520 is connected through a hole 526 at its rear edge with the forward edge of coin 502 by a connecting means 518 through hole 506, so that coin 502 and headpiece 520 are freely movable with respect to one another. Headpiece 520 has a receptacle 522 for attachment to a fishing line or swivel. Likewise, tailpiece 550 is connected to the rear edge of coin 504 by connecting element 516 through hole 512 and through hole 554 in the foremost edge of tailpiece 550. In the middle of the rear edge of tailpiece 550, a square notch of variable size is cut and hook 530 depends by connecting means 552 from hole 556 in the middle of said notch.

Figure 6:
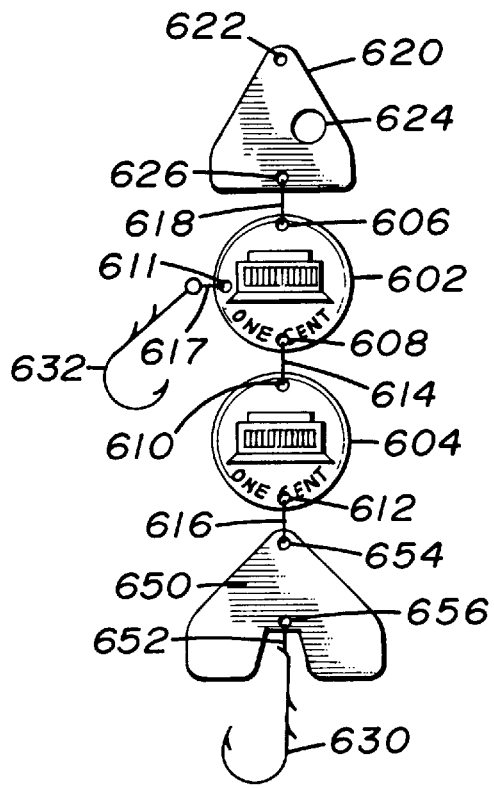
FIG. 6 shows an embodiment of the invention with other attachments formed to resemble the parts of a fish.

FIG. 6 depicts another preferred embodiment of the invention with elements that are freely movable with respect to one another. Coins 602 and 604 are disposed as in FIG. 1. Headpiece 620 is connected to coin 602 in a manner similar to that described in FIG. 5 by using a piece of wire or a connector 618 through a receptacle 626 on the head and through a receptacle 606 on the coin. Likewise tailpiece 650 is connected in the same manner as described in FIG. 5 using a connector 616 through a receptacle 612 on the coin 602 and through a receptacle 654 on the tail. The front coin 602 is connected to the rear coin 604 by use of a connector 614 through receptacles 608 and 610. Headpiece 620 is provided with a hole 624 drilled to resemble a fish's eye and a hole 622 at its foremost point for attachment to a fishing line or swivel. From the edge of coin 602, midway between the opposing holes 606 and 608, another hole 611 is provided. From hole 611 hook 632 is suspended by connecting means 617. On the tail 650, a receptacle 656 is provided for receiving a connector 652 for attaching a rearwardly mounted fish hook 630.

Figure 7:
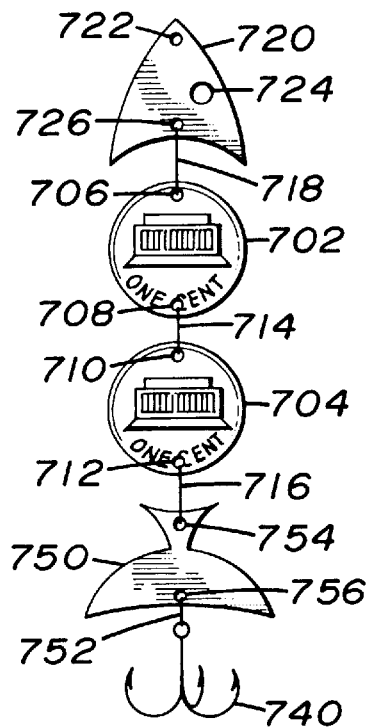
FIG. 7 shows an embodiment of the invention with attachments formed in a different fashion to resemble the parts of a fish.

FIG. 7 depicts another preferred embodiment with independently movable elements. Headpiece 720 and tailpiece 750 are made of materials similar to the head and tail pieces of preceding figures and are connected to coins 702 and 704 respectively in a manner such that each is movable with respect to the others. Headpiece 720 is provided with an eyehole 724, a forward attachment hole 722 and a rear attachment hole 726. A first coin 702 is attached to the head 720 by use of a connector 702 through the receptacles 726 and 706. The first coin 702 is attached to a second coin 704 by use of a connector 714 through holes 708 and 710. Tailpiece 750 is provided with a flared forward appendage in which attachment hole 754 is drilled so that the tailpiece may be attached to the rear coin 704 by use of connector 716 and hole 712. The concave trailing edge of said tailpiece is provided with attachment hole 756 from which treble hook 740 is suspended by connecting means 752.

The inventive concept may be implemented in a myriad of other configurations utilizing coins, hooks, connectors, substrates, reflective material, feathers, streamers, vibrators, attractive coatings and attachments, protective coatings, and decorations. While the above description contains many specifics, these should not be considered as limitations on the scope of the invention, but rather as an exemplification of one preferred embodiment thereof. Many other variations are possible. For example, the invention could be made with three, four or any number of coins. The coins could be of different size, shape, color or value. Objects other than fish body shapes can be attached to the coin body. Fishhooks can be suspended from the coins, from the objects attached thereto or from both. For greater international appreciation, coins of different countries could be used.

The described embodiments of the invention are intended in all respects to be illustrative and not restrictive. The scope of the invention is, therefore, indicated by the appended claims rather than by the foregoing description. All changes which come within the meaning and range of equivalency of the claims are to be embraced within their scope.

We claim:

1. A fishing lure comprising:
   a first coin, said first coin being generally disc-shaped, having a generally planar top, a generally planar bottom, and a generally circular outer periphery,
   a discontinuous pattern located on at least one of said first coin top and said first coin bottom, said discontinuous pattern including at least one of a representation of a building, a human being, a number, a plant, an animal, a flag, and writing,
   a first receptacle located on said first coin, said first receptacle being usable to attach said first coin to a fishing line or a swivel,
   a second receptacle located on said first coin, said second receptacle being usable to attach said first coin to a second coin,
   a second coin, said second coin being generally disc-shaped, having a generally planar top, a generally planar bottom, and a generally circular outer periphery,
   a discontinuous pattern located on at least one of said second coin top and said second coin bottom, said discontinuous pattern including at least one of a representation of a building, a human being, a number, a plant, a flag, and writing, a first receptacle located on said second coin, said first receptacle being usable to attach said second coin to said first coin, a second receptacle located on said second coin, said second receptacle being usable to attach a hook to said second coin, a first connector mounted in said first coin second receptacle and in said second coin first receptacle in order to retain said first coin and said second coin in movable engagement with each other, and a hook firmly attached to said second coin second receptacle, so that when a fish bites the lure, said hook may engage the mouth of the fish.

2. A lure as recited in claim 1 wherein said discontinuous patterns cause light to be reflected from said lure in a pattern that may resemble a fish.

3. A lure as recited in claim 1 wherein said discontinuous patterns cause light to be reflected from said lure in a pattern that may resemble a wounded fish.

4. A lure as recited in claim 3 wherein said generally disk-shaped coins move through water in a manner that resembles that of an injured fish, thereby invoking a predatory instinct in other fish and urging other fish to bite the lure.

5. A lure as recited in claim 4 wherein at least one of said coins is a United States penny.

6. A lure as recited in claim 4, wherein said hook is a treble hook.

7. A lure as recited in claim 6 wherein said discontinuous pattern includes at least one of a representation of a building, a human being, a number, and writing.

8. A lure as recited in claim 1 wherein said generally disk-shaped coins move through water in a manner that resembles that of an injured fish, thereby invoking a predatory instinct in other fish and urging other fish to bite the lure.

9. A lure as recited in claims 8, wherein said lure further comprises a feather in the vicinity of said hook.

10. A fishing lure comprising:
  a first coin, said first coin being generally disc-shaped, having a generally planar top, a generally planar bottom, and a generally circular outer periphery,
  a second coin, said second coin being generally disc-shaped, having a generally planar top, a generally planar bottom, and a generally circular outer periphery,
  a discontinuous pattern located on at least once of said coins,
  a first receptacle located on said first coin, said first receptacle being usable to attach said coin to a fishing line or a swivel,
  a second receptacle located on said second coin, said second receptacle being usable to attach said coin to another portion of the lure, including to a hook,
  a connection causing said first coin and said second coin to be movable with respect to each other when the lure moves through the water, and
  a hook firmly attached to the lure, so that when a fish bites the lure, said hook may engage the mouth of the fish;
  wherein said discontinuous pattern causes light to be reflected from said lure in a pattern that may resemble a wounded fish; and
  wherein said generally disk-shaped coin moves through water in a manner that resembles that of an injured fish, thereby invoking a predatory instinct in other fish and urging them to bite the lure.

11. A novelty item shaped to have the appearance of a fishing lure, the novelty item comprising:
  a first coin, said first coin being generally disc-shaped, having a generally planar top, a generally planar bottom, and a generally circular outer periphery,
  a second coin,
  a connection between said first coin and said second coin,
  a discontinuous pattern located on at least one of said coins, said discontinuous pattern including at least one of a representation of a building, a human being, a number, an animal, a plant, a flag, and writing,
  a first receptacle located on said first coin, said first receptacle being usable to attach said first coin to a fishing line or a swivel,
  a second receptacle located on said first coin, said second receptacle being usable to attach said first coin to another portion of the novelty item, including to a hook, and
  a hook firmly attached to the novelty item, so that when a human views the novelty item, he perceives an object which reminds him of a fishing lure.

* * * * *